(12) United States Patent
Bastnagel et al.

(10) Patent No.: US 8,453,455 B2
(45) Date of Patent: Jun. 4, 2013

(54) PANELED COMBUSTION LINER HAVING NODES

(75) Inventors: Philip M. Bastnagel, Indianapolis, IN (US); Jack Petty, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 542 days.

(21) Appl. No.: 12/642,215

(22) Filed: Dec. 18, 2009

(65) Prior Publication Data

US 2010/0162716 A1    Jul. 1, 2010

Related U.S. Application Data

(60) Provisional application No. 61/203,811, filed on Dec. 29, 2008.

(51) Int. Cl.
*F02C 1/00*        (2006.01)
*F02G 3/00*        (2006.01)

(52) U.S. Cl.
USPC ............... 60/752; 60/753; 60/754; 60/755; 60/756; 60/757; 60/758; 60/759; 60/760

(58) Field of Classification Search
USPC ................. 60/752–760; 110/336–340
See application file for complete search history.

(56) References Cited

U.S. PATENT DOCUMENTS

| | | | |
|---|---|---|---|
| 2,919,549 A * | 1/1960 | Haworth et al. ............ 60/753 |
| 4,642,993 A | 2/1987 | Sweet | |
| 4,749,029 A * | 6/1988 | Becker et al. ............... 165/47 |
| 4,832,999 A * | 5/1989 | Sweet ......................... 428/116 |
| 5,323,601 A | 6/1994 | Jarrell et al. | |
| 5,333,443 A * | 8/1994 | Halila ............................ 60/796 |
| 5,380,579 A * | 1/1995 | Bianchi ........................ 428/184 |
| 5,408,826 A * | 4/1995 | Stewart et al. .............. 60/226.1 |
| 5,596,870 A * | 1/1997 | Dillard et al. ................. 60/782 |
| 6,223,538 B1 * | 5/2001 | Benz et al. ..................... 60/753 |
| 6,438,958 B1 | 8/2002 | McCaffrey et al. | |
| 6,530,225 B1 | 3/2003 | Hadder | |
| 6,543,233 B2 | 4/2003 | Young et al. | |
| 6,606,861 B2 | 8/2003 | Snyder | |
| 6,655,146 B2 | 12/2003 | Kutter et al. | |
| 6,675,582 B2 | 1/2004 | Monty et al. | |
| 6,751,961 B2 | 6/2004 | Pacheco-Tougas et al. | |
| 2002/0066273 A1 | 6/2002 | Kitamura et al. | |
| 2002/0178728 A1 | 12/2002 | McCaffrey et al. | |
| 2003/0213249 A1 | 11/2003 | Pacheco-Tougas et al. | |
| 2005/0022531 A1 | 2/2005 | Burd | |
| 2005/0050896 A1 | 3/2005 | McMasters | |
| 2005/0086940 A1 | 4/2005 | Coughlan, III et al. | |
| 2006/0059916 A1 * | 3/2006 | Cheung et al. ................. 60/752 |
| 2011/0016869 A1 * | 1/2011 | Iwasaki .......................... 60/752 |

* cited by examiner

*Primary Examiner* — Ehud Gartenberg
*Assistant Examiner* — Craig Kim
(74) *Attorney, Agent, or Firm* — Krieg DeVault LLP

(57) ABSTRACT

The present invention relates to combustors, and provides a combustion liner that may at least partially contain a combustion process. The combustion liner may include a support structure that supports a plurality of panels. The panels may be in the form of thermal barrier panels, e.g., that are attached to the support structure and/or other parts of the machine.

23 Claims, 4 Drawing Sheets

PANELED COMBUSTION LINER HAVING NODES

CROSS REFERENCE TO RELATED APPLICATIONS

The present application claims the benefit of U.S. Provisional Patent Application No. 61,203,811, filed Dec. 29, 2008, and is incorporated herein by reference.

FIELD OF THE INVENTION

The present invention relates generally to combustors for heat generating equipment, and more particularly, to a paneled combustion liner for an engine.

BACKGROUND

Combustion processes, such as, for example, those employed in the combustor of a gas turbine, ramjet or pulsejet engine, as well as those employed in other heat generating equipment, whether for flame combustion, such as, for example, premixed flame combustion and diffusion flame combustion, as well as for catalytic combustion, operate at high temperatures. In some machines, a combustion liner is employed to at least partially contain the combustion process and to separate the heat generated by the combustion process the structural portions of the combustor and/or other parts of the machine.

SUMMARY

The present invention relates to combustors, and provides a combustion liner operative to at least partially contain a combustion process. The combustion liner includes a support structure that supports a plurality of panels. In one embodiment, the panels are in the form of thermal barrier panels that are attached to the support structure.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
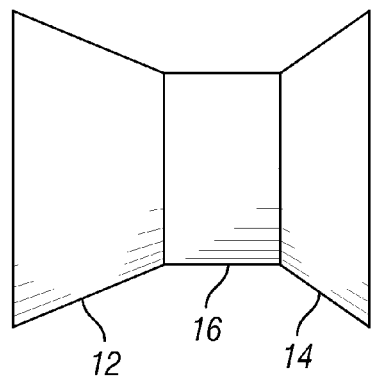
FIG. 1 schematically depicts portions of a gas turbine engine that may be employed in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular, FIG. 1, a non-limiting example of portions of a gas turbine engine 10 employed in accordance with an embodiment of the present invention are schematically illustrated. In the present embodiment, gas turbine engine 10 includes a compressor 12, a turbine 14 and a combustor 16 disposed between compressor 12 and turbine 14.

In the embodiment of FIG. 1, various features, components and interrelationships therebetween of aspects of an embodiment of the present invention are depicted. However, the present invention is not limited to the particular embodiment of FIG. 1 and/or the components, features and interrelationships therebetween as are illustrated in FIG. 1 and described herein.

Gas turbine engine 10 may be a single-spool engine or a multi-spool engine, and may be in the form of a turboshaft, turbofan, turboprop or turbojet engine. In other embodiments, gas turbine engine 10 may be in other forms, such as, for example, a ramjet, scramjet or pulsejet engine, an aero-derivative industrial engine, a marine engine, or in the form of a portion of a cogeneration plant, e.g., a combined heat and power plant. In the present embodiment, gas turbine engine 10 is an aero-engine, wherein combustor 16 is mounted adjacent compressor 12 and turbine 14. Alternatively, it is contemplated that in other embodiments, combustor 16 may be located remotely from compressor 12 and turbine 14, e.g., for certain industrial and/or power generation installations. In still other embodiments, compressor 12 may be remotely located relative to turbine 14 and combustor 16, e.g., in combined heat and power installations, where compressor 12 may pressurize air for delivery to other systems, e.g., fuel cells, prior to the air being received at combustor 16.

Figure 2:
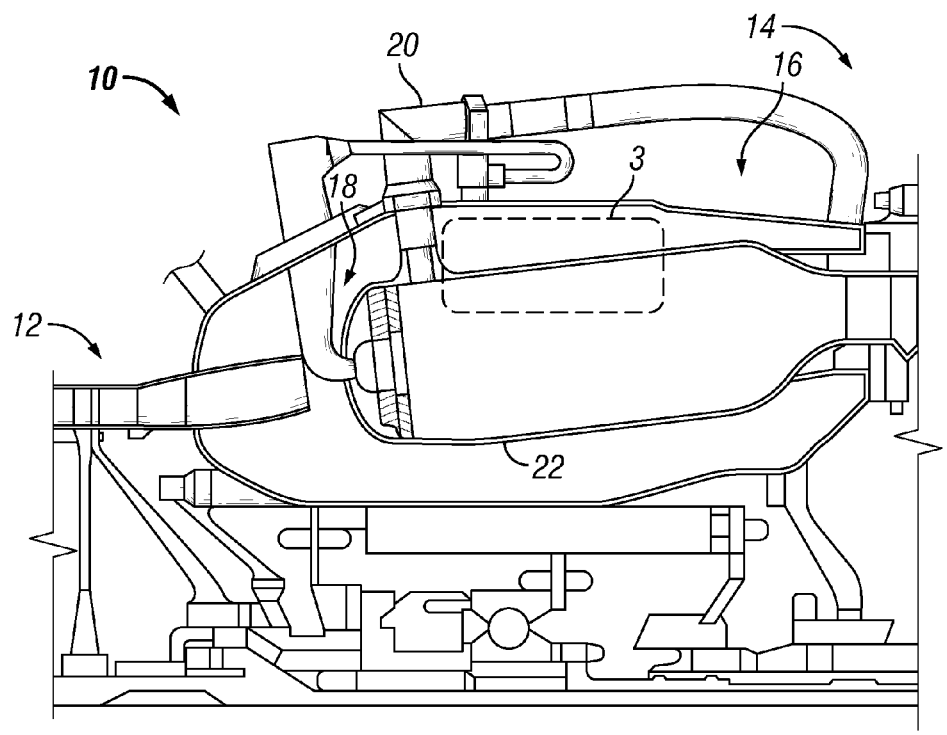
FIG. 2 is a partial cross section of an embodiment of a gas turbine engine in which a combustion liner in accordance with an embodiment of the present invention may be employed.
Figure 3:
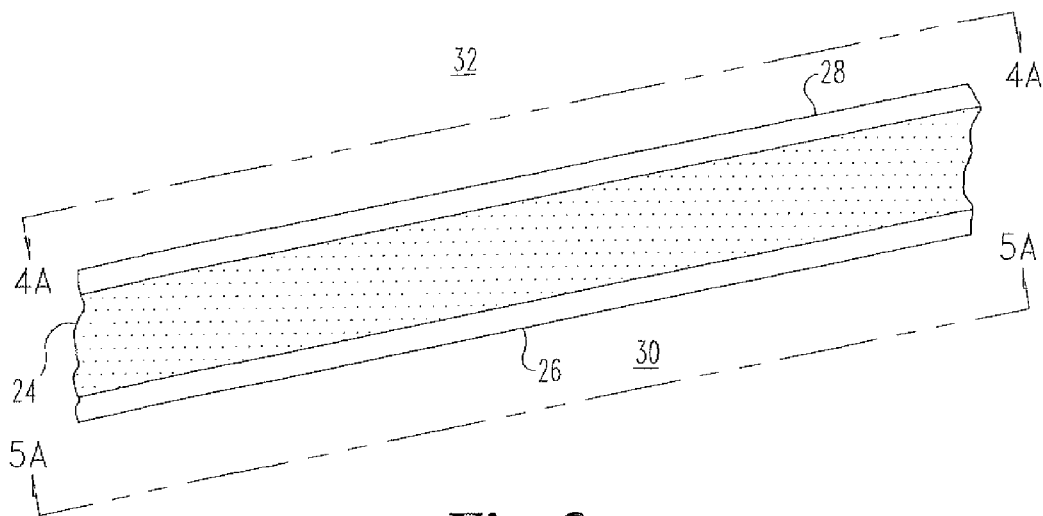
FIG. 3 is an enlarged cross-sectional view of a paneled combustion liner in accordance with an embodiment of the present invention.
Figure 4A:
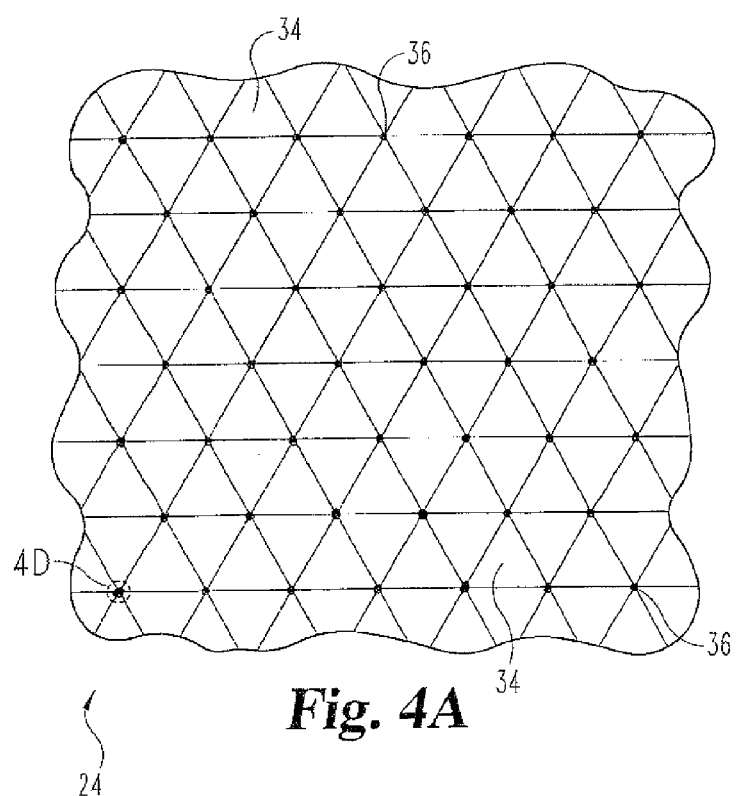
FIGS. 4A-4D schematically depict portions of a support structure for a paneled combustion liner in accordance with an embodiment of the present invention.
Figure 4B:
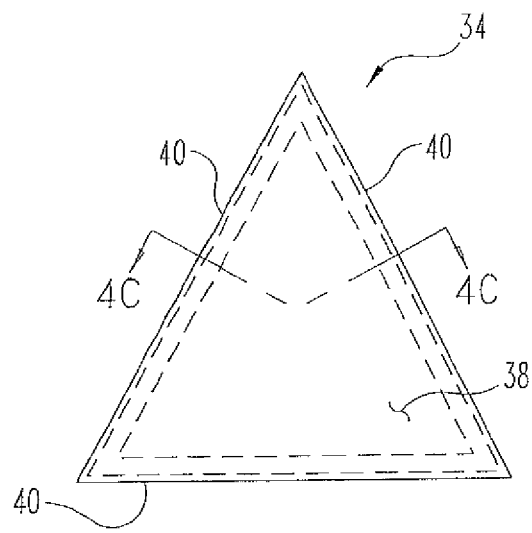
Figure 4C:
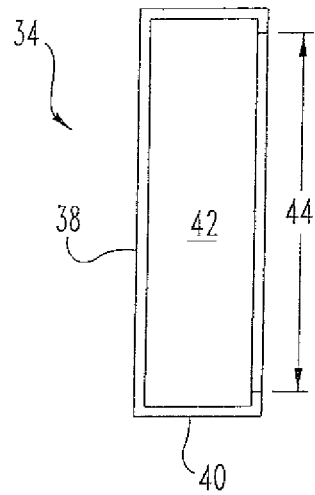
Figure 4D:
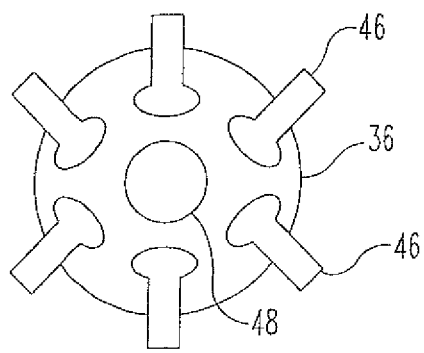

Referring now to FIGS. 2 and 3, a partial cross section of gas turbine engine 10 with an annular combustor 16 in accordance with an embodiment of the present invention is depicted. Although an annular configuration is shown, it will be understood that other combustor configurations may be employed in other embodiments. The present invention is not limited to any particular combustor size or shape unless specifically stated to the contrary.

In one form, combustor 16 of the present embodiment includes a plurality of fuel injectors 18, a plurality of igniters 20 and an annular paneled combustion liner 22. In other embodiments, combustor 16 may employ a single fuel injector and/or a single ignitor During normal operation, pressurized air is received in combustor 16, some of which is mixed with fuel injected by fuel injectors 18, and ignited by igniters 20. The combustion process may be self-sustaining, after which point igniters 20 are deactivated. In one form, the combustion process is contained within paneled combustion liner 22, e.g., radially. In other embodiments, the combustion process may only be partially contained by the combustor, e.g., in single-sided combustor arrangements. Paneled combustion liner 22 includes an opening that delivers hot gases from the combustion process from the outlet of combustor 16 to the inlet of turbine 14.

In one form, paneled combustion liner 22 includes a support structure 24 and a plurality of juxtaposed thermal barrier panels, i.e., hot side panels 26, and a plurality of cold side panels 28. Hot side panels 26 are positioned on the hot side 30 of paneled combustion liner 22, e.g., the side that contains the combustion process, which in the present embodiment is internal to paneled combustion liner 22. Cold side panels 28 are positioned on the cold side 32 of paneled combustion liner 22.

In some embodiments, hot side panels 26 and/or cold side panels 28 may include cooling air holes (not shown) to provide cooling of hot side panels 26 and/or cold side panels 28 using pressurized air discharged from compressor 12, such as, for example, impingement/effusion cooling and/or film cooling. In other embodiments, paneled combustion liner 22 may be "open" on cold side 32, i.e., may not include cold side panels 28, e.g., depending on the temperature requirements of paneled combustion liner 22, the cooling requirements of hot side panels 26, and the type of cooling scheme used for hot side panels 26, if any.

Referring now to FIGS. 4A-4D, aspects of support structure 24 of an embodiment of the present embodiment are schematically depicted. In FIGS. 4A-4D, hot side panels 26 and cold side panels 28 are removed for clarity of illustration. In the embodiment illustrated in FIGS. 4A-4D, various features, components and interrelationships therebetween of aspects of an embodiment of the present invention are depicted. However, the present invention is not limited to the particular embodiment of FIGS. 4A-4D and the components, features and interrelationships therebetween as are illustrated in FIGS. 4A-4D and described herein unless specifically provided to the contrary.

Support structure 24 includes a plurality of structural elements 34 and a plurality of nodes 36. In the present embodiment, groups of six (6) structural elements 34 are coupled together at each node 36 (except at the edge portions of support structure 24, where fewer numbers of structural elements may be coupled together). In other embodiments, greater or lesser numbers of structural elements may be coupled to each node.

In the illustrated embodiment, structural elements 34 are in the form of triangular iso-grid elements that include a plate portion 38 extending between and integral with three (3) beam portions 40, leaving an opening 42 inside each structural element 34 that extends through the opening 44 formed at the convergence of beam portions 40. It will be understood that other types of structure may be employed for support structure 24 in other embodiments. For example, other embodiments may employ plate portions that are not integral with beam portions. Further, it will be understood that the present invention is not limited to triangular-shaped structural elements 34, but that any suitable shape may be employed in other embodiments. Still further, in some embodiments, plate portions 38 may serve as cold side panels 28, in which case cold side panels 28 are integral with structural elements 34.

In other embodiments, support structure 24 may be formed as an integral iso-grid structure, such as in the form of a casting, a machining, a weldment and/or a brazed structure, wherein the structural elements 34 are integral with each other, i.e., parts of a unitary structure, e.g., as opposed to being coupled together via nodes 36. In still other embodiments, support structure 24 may be in the form of a truss structure, e.g., wherein beam portions 40 are employed without plate portion 38. In such embodiments, each structural element 34 may be triangular shaped elements consisting of three beam portions 40 that are formed as a unitary structure, e.g., by machining a block of material or brazing or welding together the beam portions 40. The structural elements 34 may then be coupled to each other by nodes 36 to form support structure 24.

Alternatively, support structure 24 may be formed as a unitary structure from beam portions 40, e.g., by welding and/or brazing together a plurality of beam portions 40, or by machining a block of material, casting and/or forging to yield integral beam portions 40. As another alternative, individual beam portions 40 may be connected at their respective ends by nodes 36, thereby forming support structure 24.

In the present embodiment, structural elements 34 are coupled together using nodes 36 in a self-locking arrangement, e.g., using dog bone connector pins 46 extending through holes in each node 36 into mating holes in each corresponding structural element 34 (e.g., one dog bone connector pin per structural element 34). Nodes 36 of the present embodiment also include an opening 48 for use in attaching hot side panels 26, which may also be used for attaching cold side panels 28.

Figure 5A:
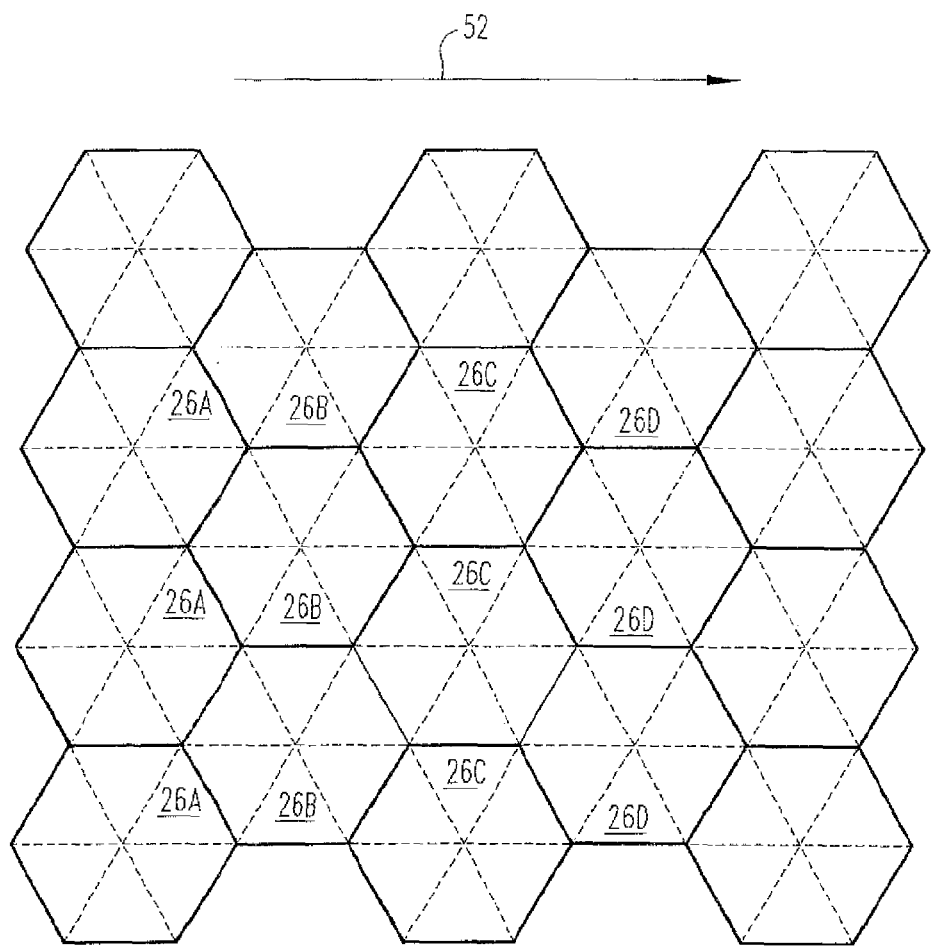
FIGS. 5A and 5B schematically depict panels employed in a paneled combustion liner in accordance with an embodiment of the present invention.
Figure 5B:
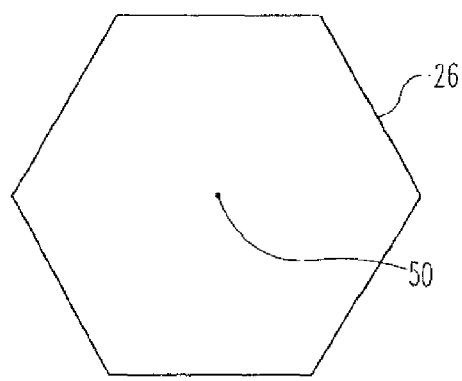

Referring now to FIGS. 5A and 5B, some aspects of hot side panels 26 and cold side panels 28 are described. The description set forth below is made with respect to hot side panels 26 for purposes of convenience, and applies equally to cold side panels 28. It will be noted that hot side panels 26 and cold side panels 28 may be made from the same and/or different materials.

In the embodiment of FIGS. 5A and 5B, various features, components and interrelationships therebetween of aspects of an embodiment of the present invention are depicted. However, the present invention is not limited to the particular embodiment of FIGS. 5A and 5B and the components, features and interrelationships therebetween as are illustrated in FIGS. 5A and 5B and described herein.

With reference to FIG. 5A, there is illustrated a plurality of hot side panels 26 coupled to support structure 24 (which is shown behind hot side panels 26, as indicated by dashed lines). Enumerated are four (4) exemplary hot side panels 26A-26D for purposes of discussion. Hot side panels 26 of the present embodiment are of an N-gon shape. Also, in the present embodiment, hot side panels 26 are arranged in juxtaposition on all sides to prevent hot combustion gases from reaching support structure 24, serving as thermal barriers against convective and radiative heat transfer. In the illustrative embodiment, N=6, and therefore, hot side panels 26 are hexagonal in shape, and are arranged in juxtaposition with six (6) other hot side panels 26, one for each of the six (6) sides of the hexagonal shape. However, the present invention is not limited to hexagonal shapes so arranged. For example, triangular and/or other shapes for hot side panels 26 may be employed in other embodiments.

In the present embodiment, each hot side panel 26 includes a centrally located attachment feature 50 that is configured for attachment to support structure 24 via a node 36. For example, in the present embodiment, attachment feature 50 (FIG. 5B) is a stud that is received into opening 48 of an adjacent node 36, and which is secured by a nut (not shown). However, other attachment types may be employed without departing from the scope of the present invention, e.g., such as clip arrangements that may attached to the center of each hot side panel 26 or at the edges of each hot side panel 26.

Hot side panels 26 are thermal barrier panels, and configured to be interchangeable. The materials from which hot side panels 26 are formed, and the cooling schemes employed, may vary with the temperature requirements at the location of any particular hot side panel 26. For example, if local temperatures are higher in one or more locations on paneled combustion liner 22, materials and/or cooling schemes for hot side panels 26 that are suitable for operation at such temperatures may be employed at those particular locations. Conversely, where materials and/or cooling schemes having lower temperature capabilities may be employed at cooler locations. Thus, different configurations of hot side panels 26 may be employed at different locations in order to accommodate operating temperatures at the different locations. However, the present application also contemplates embodiments wherein all hot side panels 26 have the same cooling schemes and material selection.

In FIG. 5A, for purposes of illustration, the temperature on the hot side of paneled combustion liner 22 is assumed to be increasing in direction 52. Accordingly, in some embodiments, the materials and/or cooling schemes for hot side panels 26B may be employed to yield panels having greater temperature capability than that of hot side panels 26A. Similarly, materials and/or cooling schemes for hot side panels 26C may be employed to yield panels having greater temperature capability than that of hot side panels 26B. Along the same theme, materials and/or cooling schemes for hot side panels 26D may be employed to yield panels having greater temperature capability than that of hot side panels 26C. The panel materials and cooling schemes for each individual hot side panel may be tailored to suit the particular local temperature requirements of paneled combustion liner 22 in some embodiments, or may not be tailored to suit particular local temperature requirements in other embodiments, e.g., where the same panel configurations are used throughout.

Although the depiction of FIG. 5A contemplates that hot side temperature increases in direction 52, it will be understood that the present invention is not limited to any particular temperature gradient. Rather, the panel materials and cooling schemes for each individual hot side panel 26 may be tailored to accommodate any hot side temperature profile of paneled combustion liner 22. Further, the size of hot side panels 26 may be selected to accommodate the temperature profile of paneled combustion liner 22.

It will be noted that the present invention is not limited to any particular material or cooling scheme for hot side panels 26. For example, metallic, intermetallic, ceramic and/or composite materials may be employed to form solid wall structures. Cooling schemes may include the use of, for example, transpiration cooled multiwall structures, as well as effusion, slot-film, multi-hole and/or screened configurations.

For example, at hotter locations, it may be desirable to employ ceramic hot side panels 26. At somewhat cooler locations, on the other hand, foam metal or effusion cooled metallic panels may be employed.

The materials and cooling schemes for hot side panels 26 at different locations may be selected based on local temperatures, per se, and/or based on anticipated thermal growth, e.g., so as to reduce thermally induced stresses in hot side panels 26 and/or support structure 24. The materials may also be selected based on other parameters, such as pressure loading, g-loading, etc.

In one form hot side panels 26 are interchangeable, e.g., so that a damaged panel may be replaced with a new one, i.e., without replacing the entire paneled combustion liner 22, or so that a lower temperature-capable panel may be replaced with a higher temperature-capable panel or vice versa, depending on the temperatures and/or thermal growth experienced at the locations of such panels. Because the hot-side panels 26 of the present embodiment employ the same N-gon shape, any panel may be replaced with another panel of the same or different material and/or cooling scheme. The panels may be interchangeably positioned in both the direction of flow, e.g., the axial direction extending along the centerline of gas turbine engine 10, and in the circumferential direction, i.e., circumferentially around the annular paneled combustion liner 22. Thus, in some embodiments, panels of different materials and/or having different cooling schemes may be selectively positioned both axially and circumferentially in order to accommodate local temperatures, e.g., local hot spots and cold spots, as well as intermediate temperature conditions therebetween.

Higher temperature-capable materials/cooling schemes may be more expensive than lower temperature-capable materials/cooling schemes, in which case the higher temperature-capable panels may be deployed to local hot spots, whereas lower temperature capable panels may be deployed to local cold spots, and panels of varying degrees of intermediate temperature-capability may be deployed at corresponding intermediate temperature locations.

In some embodiments, because the panels 26 may be coupled to support structure 24 at single locations on each hot side panel 26, the hot flowpath wall formed by hot side panels 26 may be at least partially divorced from the relatively cooler support structure 24, and hence thermal stresses in both hot side panels 26 and support structure 24 may be reduced in such embodiments, although the present invention is not limited as such.

Embodiments of the present invention may include a paneled combustion liner, including a support structure having a plurality of structural elements and a plurality of nodes, wherein each node of the plurality of nodes is structured to couple together a group of structural elements of the plurality of structural elements; a plurality of hot side panels having a first common shape coupled to a hot side of the support structure, each hot side panel of the plurality of hot side panels being coupled to one of the plurality of nodes; and a plurality of cold side panels having a second common shape coupled to a cold side of the support structure, each cold side panel of the plurality of cold side panels being coupled to one of the plurality of nodes.

In a refinement, the support structure may be in the form of an iso-grid, the structural elements in the form of iso-grid elements, and each node structured to couple together at least three of the iso-grid elements.

In another refinement, the support structure is in the form of a truss structure, the structural elements are in the form of beams, and each node is structured to couple together at least three of the beams.

In yet another refinement, the first common shape may be in the form of an N-gon. The N-gon may be a hexagon. The second common shape may be in the form of an N-gon. The N-gon may be a hexagon.

In some embodiments, a first subset of the plurality of hot side panels may employ a first cooling scheme; and a second subset of the plurality of hot side panels may employ a second cooling scheme different from the first cooling scheme, wherein each hot side panel of the first subset and each hot side panel of the second subset are selectively positioned on the combustion liner based on local temperatures of the paneled combustion liner.

In some embodiments, a third subset of the plurality of hot side panels may employ a third cooling scheme different from the first cooling scheme and the second cooling scheme, wherein each hot side panel of the first, second and third subsets are selectively positioned on the combustion liner based on the local temperatures.

In some embodiments, a first subset of the plurality of hot side panels may be formed of a first material, and a second subset of the plurality of hot side panels may be formed of a second material different from the first material. Each hot side panel of the first subset and each hot side panel of the second subset may be selectively positioned on the combustion liner based on local temperatures. In addition, the hot side panels may be structured for interchangeable positioning in both an axial direction and a circumferential direction based on the local temperatures.

In other embodiments, a third subset of the plurality of hot side panels may be formed of a third material different from the first material and the second material, wherein each hot side panel of the first, second and third subsets are selectively positioned on the combustion liner based on the local temperatures.

In still other embodiments, a fourth subset of the plurality of hot side panels may be formed of a fourth material different from the first material, the second material and the third material, wherein each hot side panel of the first, second, third and fourth subsets are selectively positioned on the combustion liner based on the local temperatures.

Each hot side panel may be coupled to a single node of the support structure. In some embodiments, each hot side panel may be coupled to the single node at a center of the hot side panel. Each cold side panel may be coupled to a single node of the support structure. In some embodiments, each cold side panel may be coupled to the single node at a center of the cold side panel.

Each hot side panel and each cold side panel may be the same size and shape.

In some embodiments, a number of dog bone connectors may be structured to secure a corresponding number of adjacent structural elements to one of the nodes. The plurality of structural elements and the plurality of nodes may be configured in a self-locking arrangement.

Each structural element of the plurality of structural elements may be triangular in shape.

Other embodiments may include a paneled combustion liner, including a support structure having a plurality of structural elements and a plurality of nodes, wherein each node of the plurality of nodes is structured to couple together a group of structural elements of the plurality of structural elements; and a plurality of thermal barrier panels, wherein each thermal barrier panel of the plurality of thermal barrier panels has an N-gon shape and is coupled to a hot side of the support structure at one of the plurality of nodes, and wherein each thermal barrier panel is arranged in juxtaposition on all sides to adjacent thermal barrier panels to shield the support structure from hot combustion gases inside the combustion liner.

Still other embodiments may include an interchangeable thermal barrier panel for a paneled combustion liner, wherein the interchangeable thermal barrier panel has an N-gon shape and is structured to attach to a combustion liner support structure in juxtaposition to a plurality of others of the interchangeable thermal barrier panels, wherein the combustion liner is structured to support a plurality of juxtaposed interchangeable thermal barrier panels, and wherein the plurality of juxtaposed interchangeable thermal barrier panels are arranged to prevent hot combustion gases from reaching the support structure. In some embodiments, N is 6.

The interchangeable thermal barrier panel may be structured to attach to the paneled combustion liner at a single location on the interchangeable thermal barrier panel.

Yet other embodiments may include a gas turbine engine. The gas turbine engine may include a compressor; a turbine; and a combustor fluidly disposed between the compressor and the turbine, the combustor including a combustion liner. The combustion liner may include a support structure having a plurality of structural elements and a plurality of nodes, wherein each node of the plurality of nodes is structured to couple together a group of structural elements of the plurality of structural elements; a plurality of hot side panels having a first common shape coupled to a hot side of the support structure, each hot side panel of the plurality of hot side panels being coupled to one of the plurality of nodes; and a plurality of cold side panels having a second common shape coupled to a cold side of the support structure, each cold side panel of the plurality of cold side panels being coupled to one of the plurality of nodes.

Still other embodiments may include a gas turbine engine. The gas turbine engine may include a compressor; a turbine; and a combustor fluidly disposed between the compressor and the turbine, the combustor including a combustion liner. The combustion liner may include a support structure having a plurality of structural elements and a plurality of nodes, wherein each node of plurality of nodes is structured to couple together a group of structural elements of the plurality of structural elements; and a plurality of thermal barrier panels, wherein each thermal barrier panel of the plurality of thermal barrier panels has an N-gon shape and is coupled to a hot side of the support structure at one of the plurality of nodes, and wherein each thermal barrier panel is arranged in juxtaposition on all sides to adjacent thermal barrier panels to shield the support structure from hot combustion gases adjacent to the combustion liner.

Yet still other embodiments may include a gas turbine engine. The gas turbine engine may include a compressor; a turbine; and a combustor fluidly disposed between the compressor and the turbine, the combustor including a combustion liner. The combustion liner may include means for providing structural support for the combustion liner; means for shielding the means for providing structural support from hot combustion gases in the combustor; and means for attaching the means for shielding to the means for providing structural support.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A paneled combustion liner, comprising:
   a support structure of the combustion liner, wherein said support structure has having a plurality of structural elements and a plurality of nodes, each node said plurality of nodes being structured to couple together a group of structural elements of said plurality of structural elements;
   a plurality of hot side panels, wherein each hot side panel of said plurality of hot side panels has a common shape;

wherein said plurality of hot side panels is coupled to a hot side of said support structure; and wherein each hot side panel of said plurality of hot side panels is coupled to one of said plurality of nodes; and a plurality of cold side panels, wherein each cold side panel of said plurality of cold side panels has a common shape; wherein said plurality of cold side panels is coupled to a cold side of said support structure; and wherein each cold side panel of said plurality of cold side panels is coupled to one of said plurality of nodes.

2. The paneled combustion liner of claim 1, wherein said support structure is in the form of an iso-grid, said structural elements are in the form of iso-grid elements, and said each node is structured to couple together at least three of said iso-grid elements.

3. The paneled combustion liner of claim 1, wherein said support structure in the form of a truss structure, said structural elements are in the form of beams, and said each node is structured to couple together at least three of said beams.

4. The paneled combustion liner of claim 1, wherein the hot side panels and/or the cold side panels have an N-gon shape.

5. The paneled combustion liner of claim 4, wherein said N-gon is a hexagon.

6. The paneled combustion liner of claim 1, wherein said hot side panels are structured for interchangeable positioning on said paneled combustion liner in both an axial direction and a circumferential direction.

7. The paneled combustion liner of claim 1, wherein a first subset of said plurality of hot side panels employ a first cooling scheme; a second subset of said plurality of hot side panels employ a second cooling scheme different from said first cooling scheme, and wherein each hot side panel of said first subset and each hot side panel of said second subset are selectively positioned on said combustion liner based on local temperatures of said paneled combustion liner.

8. The paneled combustion liner of claim 7, wherein a third subset of said plurality of hot side panels employs a third cooling scheme different from said first cooling scheme and said second cooling scheme, and wherein each hot side panel of said first, second and third subsets are selectively positioned on said combustion liner based on the local temperatures.

9. The paneled combustion liner of claim 1, wherein a first subset of said plurality of hot side panels is formed of a first material; a second subset of said plurality of hot side panels is formed of a second material different from said first material, and wherein each hot side panel of said first subset and each hot side panel of said second subset are selectively positioned on said combustion liner based on local temperatures of said paneled combustion liner.

10. The paneled combustion liner of claim 9, wherein a third subset of said plurality of hot side panels is formed of a third material different from said first material and said second material, and wherein each hot side panel of said first, second and third subsets are selectively positioned on said combustion liner based on the local temperatures.

11. The paneled combustion liner of claim 10, wherein a fourth subset of said plurality of hot side panels is formed of a fourth material different from said first material, said second material and said third material, wherein each hot side panel of said first, second, third and fourth subsets are selectively positioned on said combustion liner based on the local temperatures.

12. The paneled combustion liner of claim 1, wherein said each hot side panel is coupled to a single node of said support structure.

13. The paneled combustion liner of claim 12, wherein said each hot side panel is coupled to said single node at a center of said hot side panel.

14. The paneled combustion liner of claim 1, further comprising a number of dog bone connectors structured to secure a corresponding number of adjacent structural elements to one of said nodes.

15. The paneled combustion liner of claim 14, wherein said plurality of structural elements and said plurality of nodes are configured in a self-locking arrangement.

16. The paneled combustion liner of claim 1, wherein each structural element of said plurality of structural elements is triangular in shape.

17. A paneled combustion liner, comprising:
a support structure having a plurality of structural elements and a plurality of nodes, each node of said plurality of nodes is structured to couple together a group of structural elements of said plurality of structural elements; and
a plurality of thermal barrier panels, wherein each thermal barrier panel of said plurality of thermal barrier panels has an N-gon shape and is coupled to a hot side of said support structure at one of said plurality of nodes, and wherein said each thermal barrier panel is arranged in juxtaposition on all sides to adjacent thermal barrier panels to shield said support structure from hot combustion gases inside said combustion liner; and
a plurality of cold side panels, wherein each cold side of said plurality of cold side panels is coupled to one of said plurality of nodes.

18. An interchangeable thermal barrier panel for a paneled combustion liner, said interchangeable thermal barrier panel having an N-gon shape and being structured to attach to a combustion liner support structure in juxtaposition to a plurality of others of said interchangeable thermal barrier panels, wherein said combustion liner is structured to support a plurality of juxtaposed said interchangeable thermal barrier panels via a plurality of nodes, and wherein said plurality of juxtaposed interchangeable thermal barrier panels are arranged to prevent hot combustion gases from reaching said support structure.

19. The interchangeable thermal barrier panel of claim 18, wherein said interchangeable thermal barrier panel is structured to attach to said paneled combustion liner at a single location on said interchangeable thermal barrier panel.

20. The interchangeable thermal barrier panel of claim 18, wherein N is 6.

21. The panel combustion liner of claim 1, which further includes a gas turbine engine having a compressor, turbine and combustor including the paneled combustion liner.

22. The paneled combustion liner of claim 17, which further includes a gas turbine engine having a compressor, turbine and combustor including the paneled combustion liner.

23. A gas turbine engine, comprising:
a compressor;
a turbine; and
a combustor fluidly disposed between said compressor and said turbine, said combustor including a combustion liner, said combustion liner having:
means for providing structural support for said combustion liner;
means for shielding said means for providing structural support from hot combustion gases in said combustor; and
means for attaching said means for shielding to said means for providing structural support, wherein said means for attaching attaches said means for shielding to said means for providing via a plurality of nodes.

\* \* \* \* \*